Figure 1:
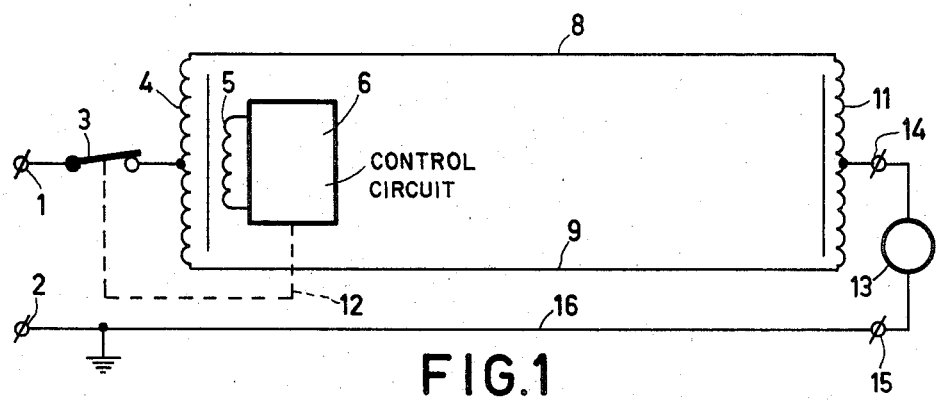

United States Patent [19]

Blok

[11] 4,358,809
[45] Nov. 9, 1982

[54] PERSONAL PROTECTION CIRCUIT

[75] Inventor: Huibert Blok, Hilversum, Netherlands

[73] Assignee: U.S. Philips Corporation, New York, N.Y.

[21] Appl. No.: 262,283

[22] Filed: May 11, 1981

[30] Foreign Application Priority Data

May 9, 1980 [NL] Netherlands .......................... 8002667

[51] Int. Cl.³ .............................................. H02H 3/16
[52] U.S. Cl. ......................................... 361/46; 361/42; 361/50
[58] Field of Search ........................ 361/42, 44, 45, 46, 361/49, 50

[56] References Cited

U.S. PATENT DOCUMENTS 3,579,037 5/1971 Hackman .............................. 361/46

FOREIGN PATENT DOCUMENTS 227930 1/1925 United Kingdom .................. 361/46

Primary Examiner—Reinhard J. Eisenzopf
Attorney, Agent, or Firm—Thomas A. Briody; Jack Haken; Paul R. Miller

[57] ABSTRACT

A personnel protection circuit for electrical supply systems comprises a normally closed switch connected between a source of electric power and a load. Two parallel conductors are connected between the switch and the load, and include a control circuit having a current unbalance detector for detecting current unbalance between the two conductors. Upon detection of such current unbalance, the normally closed switch is opened thereby disconnecting the electrical supply. Such control circuit devices may be included in both lines of the electrical supply system between the source and the load, or alternatively, further control circuit devices may be provided at both the source end and the load end of the parallel conductors.

7 Claims, 3 Drawing Figures

PERSONAL PROTECTION CIRCUIT

The invention relates to a personnel protection circuit in electrical supply systems comprising a first and a second conductor with the conductors being connected to a source of electric power and being connectable at their other ends to a load, a normally-closed switching means arranged between the source of the electric power and at least the first conductor, and a control circuit including a current unbalance detector coupled to the switching means, the control circuit responding when one conductor has a low resistance to ground and then activating the switching means in such manner that a relevant conductor is disconnected from the source of electric power.

Great dangers may occur in supply systems in which power is applied to one or more loads over large distances by cables. A typical example of a dangerous situation is the situation in which the cable is damaged and may be completely broken during digging operations. The copper line conductors are then accessible to, for example, a child playing in a hole left by the digging operations. A further dangerous situation may occur if personnel do not observe the safety measures prescribed during operations on equipment including the cable heads and the circuitry and plugs connected to the cable and also during operations on the current-carrying copper conductors in the cables, which are normally shielded by the sheath. Such safety precautions being for example, the prescribed switching-off of the voltage and grounding of the conductors prior to the repair operations.

United States Published Patent application Ser. No. 534,915 discloses a protection circuit in which the first conductor carries a high voltage and the second conductor is a return conductor. Normally-closed switching means are arranged in series with the first conductor. The current unbalance detector has a core of annular, magnetic material. The first conductor and the return conductor extend towards the load by the hole in the ring. Furthermore, a coil is provided around a portion of the ring, the ends of this coil being connected to the control circuit which is coupled to the normally-closed switching means. The load is formed by, for example, a motor, a drilling installation or a dish washer, mounted on a frame which is connected to a ground conductor. In normal working conditions the magnitude of the currents flowing in the conductor and the return conductor will be equal. No magnetic field will then be present in the region of the core and consequently no induction current will be generated in the coil. When, however, the first conductor comes into contact with the ground conductor by a person or another low resistance means a current unbalance will be measured at the ends of the coil. The normally-closed switching means is then opened by means of the control circuit and the connection between the conductor and the source of electric power is then interrupted. The control circuit is of such an implementation that, when the return conductor comes into contact with the ground conductor by a person or by another low-resistance means, the switching means is opened by switching off the drive to the switching means.

This prior art protection circuit cannot be used without further measures in cable transmission systems since the return conductor is usually accommodated in a coaxial cable separate from the first conductor. It is an object of the invention to provide a protection circuit suitable for use in cable transmission systems and in which the use of the return conductor is not necessary.

The invention is characterized in that a third conductor is arranged in parallel with the first conductor, the initial connecting ends of the first and the third conductors being coupled to each other and to the control circuit including the current unbalance detector in such manner that in operation the current direction is the same in the first and the third line conductors, the current unbalance detector detecting current unbalance between the first and the third conductors.

Figure 2:
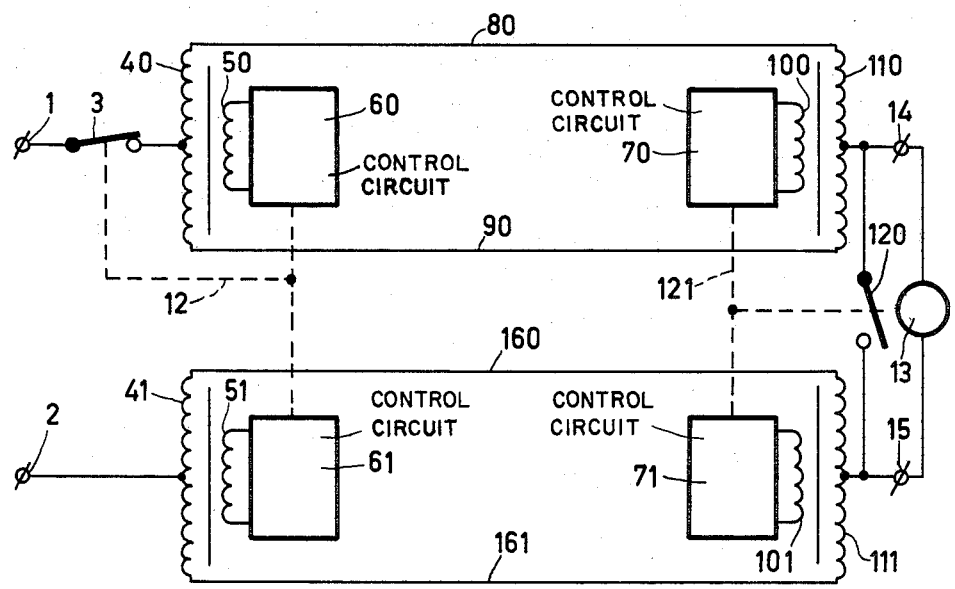
Figure 3:
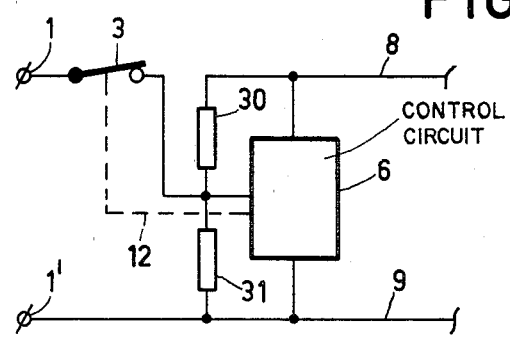

Embodiments of the invention will now be described, by way of example, with reference to the accompanying drawings, in which:

FIG. 1 shows a first embodiment of a protection circuit according to the invention, FIG. 2 shows a second embodiment of a protection circuit according to the invention, and FIG. 3 shows an alternative arrangement for coupling the conductors of the embodiments shown in FIGS. 1 or 2 to the current unbalance detector.

In the embodiment shown in FIG. 1 a power system is shown which can be used, for example, for the supply of power in cable transmission systems such as fiber-optic transmission systems. The normally-closed switching means is formed by a switch 3, which is connected between a supply point 1 and the center tap of a center tapped coil 4, arranged between first ends of a first conductor 8 and a third conductor 9. A first end of a second conductor 16 is connected to a supply point 2. The other end of the second conductor 16 is connected to a terminal 15 of a load 13. The other ends of the first conductor 8, and the third conductor 9 are inter-connected by a center tapped coil 11. The center tap of this coil 11 is connected to a terminal 14 of the load 13. A control circuit 6, which includes a current unbalance detector is connected to a coil 5 which is magnetically coupled to the coil 4. The control circuit including a current unbalance detector is not shown in greater detail. It may, for example, be constructed as described in the United States Published Patent application Ser. No. 534,915. Other alternative control circuits having current unbalance detectors may be used.

The protection circuit shown in FIG. 1 operates as follows. In normal operating conditions the currents flowing through the conductors 8 and 9 will be substantially equal to each other. Accordingly the currents are in balance and the current unbalance detector will not cause the control circuit 6 to produce a control signal. If, however, one of the conductors 8 and 9 is touched by a person, the relevant conductor will have a low-resistance path to ground. The currents in the conductors 8 and 9 are then no longer in balance. The current unbalance detector in the control circuit 6 detects this condition and applies a control signal to the control circuit 6 to cause the normally-closed switch 3 to be opened and the connection between the conductors 8 and 9 and the source of electric power to be interrupted. Only when the conductors 8 and 9 are touched simultaneously by a person is there a chance that the current unbalance detector will not respond.

A method to reduce the possibility that the line conductors 8 and 9 are touched simultaneously is shown in the embodiment of FIG. 2. In FIG. 2 the conductor 16 as shown in FIG. 1 is also split into two parallel conductors 160 and 161. The normally-closed switching means is formed by the switch 3, which is connected between the center tap of a center-tapped coil 40, provided between the conductor 80 and the conductor 90, and the supply point 1. One terminal of the coil 40 is connected to the first conductor 80 and the other terminal of the coil 40 is connected to the third conductor 90. The control circuit 60, which includes a current unbalance detector is connected to a coil 50, which is magnetically coupled to the coil 40. The other ends of the conductors 80 and 90 are connected by means of a center-tapped coil 110. A second control circuit 70, which includes a current unbalance detector, is connected to a coil 100, which is magnetically coupled to the coil 110. The second conductor 160 is connected to one end of a center-tapped coil 41 and a fourth conductor 161 is connected to the other end of the coil 41. The center tap of the coil 41 is connected to the supply point 2. A third control circuit 61, which includes a current unbalance detector is connected to a coil 51, magnetically coupled to the coil 41. The other connecting ends of the conductors 160 and 161 are connected to each other by means of a center-tapped coil 111. A fourth control circuit 71, which comprises a current unbalance detector is connected to a coil 101 which is magnetically coupled to the coil 111. The center tap of the coil 100 is connected to a point 14 and the center tap of the coil 111 is connected to a point 15. The load 13 is connected between the points 14 and 15. A short-circuiting switch 120 is arranged between the center taps of the coils 100 and 111.

When one of the conductors 80 and 90 is touched by a person, the current unbalance detectors in the two control circuits 60 and 70 will detect this and will produce a control signal. The control signal produced by the control circuit 60 causes the switch 3 to be opened as a result of which the connection between the supply point 1 and the two conductors 80 and 90 is broken. The control signal produced by control circuit 70 causes the short-circuiting switch 120 to be closed as a result of which the high voltage occurring at the load 13 is short-circuited. Short-circuiting the dangerous voltage occurring at the load 13 achieves a direct protection and, as shown in FIG. 2, may be combined with a maximum current circuit as shown in FIG. 1. When a person touches one of the conductors 160 and 161, the current unbalance detectors in the two control circuits 61 and 71 will detect this and will cause the control circuit to produce a control signal. The control signal produced by the control circuit 61 causes the switch 3 to be opened as a result of which the connection between the supply point 1 and the two conductors 80 and 90 is broken. The control signal produced by the control circuit 71 causes the short-circuiting switch 120 to be immediately closed as a result of which the high voltage occurring at the load 13 is short-circuited. The connection between the switch 3 and the two control circuits 60 and 61 is schematically represented by the broken line 12. This connection can be realized by means of techniques which are known to one having normal skill in the art. This also applies to the connection, indicated by means of a broken line 121, between the short-circuiting switch 120 and the two control circuits 70 and 71. It should, moreover, be noted that it has been found in practice that short-circuiting switch 120 ranks first for an optimum personnel protection. This is a result of the fact that, however rapidly the switch 3 can be opened, the capacitances of the wires of the cable with respect to earth retain the switched-off voltage for a short period of time, so that a person also accidentally holding a cable may yet be subjected to a perilous shock. This danger is largely prevented by the use of the short-circuiting switch 120. A maximum current circuit, for example a fuse, may for example be used instead of switch 3.

In the embodiments shown in FIGS. 1 and 2, the conductors (8, 9); (80, 90) and (160, 161) are coupled to each other by means of coils. An alternative manner of coupling is, however, also possible. FIG. 3 shows an example thereof. It is possible to connect a voltage divider formed by the resistors 30 and 31 between the conductors 8 and 9 instead of a coil 4 as shown in FIG. 1 or instead of the coils 60, 61, 70 and 71 in FIG. 2. In principle, these resistors have equal resistance values. The control circuit 6 comprising a current unbalance detector is connected to the center tap of the voltage divider. When the current in one of the line conductors 8 and 9 increases with respect to the current through the other line conductor as a result of the fact that one of the conductors is touched by a person, the voltage across the resistor which is connected to the touched conductor will increase, in response to which the control circuit 6 is energized. The switch 3 will then be opened.

What is claimed is:

1. A personnel protection circuit in electrical supply systems comprising:

at least two conductors connected between a source of electric power and a load, normally closed switching means arranged between said source and said load in at least one of said two conductors for maintaining current supply to said load, control circuit means for opening said switching means upon current unbalance, said control circuit means including a current unbalance detector for detecting said current unbalance, and at least one further conductor connected in parallel with at least one of said two conductors, said parallel connected conductors being coupled to maintain the same current direction, and said current unbalance detector detecting current unbalance between said parallel connected conductors, wherein another conductor is provided in parallel with the other of said two conductors to provide second parallel connected conductors, said second parallel connected conductors having their ends coupled together, and wherein a second control circuit means including a second current unbalance detector is provided at initial ends of said second parallel connected conductors toward said source to detect current unbalance between said second parallel connected conductors, said second control circuit means also being coupled to said normally closed switching means, wherein both said first and second parallel connected conductors toward said load are connected respectively to third and fourth control circuit means, each including a respective third and fourth current unbalance detector, said third and fourth control circuit means being coupled to a short-circuiting means connected across said load, said load being connected between couplings of said first parallel connected conductors and couplings of said second parallel connected conductors.

2. A personnel protection circuit according to claim 1, wherein another conductor is provided in parallel with the other of said two conductors to provide second parallel connected conductors, said second parallel connected conductors having their ends coupled together, and wherein a second control circuit means including a second current unbalance detector is provided at initial ends of said second parallel connected conductors toward said source to detect current unbalance between said second parallel connected conductors, said second control circuit means also being coupled to said normally closed switching means.

3. A personnel protection circuit according to claim 2, wherein both said first and second parallel connected conductors toward said load are connected respectively to third and fourth control circuit means, each including a respective third and fourth current unbalance detector, said third and fourth control circuit means being coupled to a short-circuiting means connected across said load, said load being connected between couplings of said first parallel connected conductors and couplings of said second parallel connected conductors.

4. A personnel protection circuit according to claim 1, wherein said parallel connected conductors are coupled together at their ends by coils.

5. A personnel protection circuit according to claim 4, wherein said coils are center-tapped coils.

6. A personnel protection circuit according to claim 4, wherein said control circuit means are coupled to said coils by secondary coils.

7. A personnel protection circuit according to claim 1, wherein said parallel connected conductors are coupled together by a voltage divider, said control circuit means connected to a center tap of said voltage divider.

* * * * *